(12) United States Patent
Rutherford et al.

(10) Patent No.: US 10,325,015 B2
(45) Date of Patent: *Jun. 18, 2019

(54) CONVERSION OF DATA RANGES TO TABLE OBJECTS

(71) Applicant: MICROSOFT TECHNOLOGY LICENSING, LLC, Redmond, WA (US)

(72) Inventors: Allison Jane Rutherford, Seattle, WA (US); Uhl Albert, Kirkland, WA (US); John Campbell, Renton, WA (US); Aaron Lamar Wilson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/012,707

(22) Filed: Jun. 19, 2018

(65) Prior Publication Data

US 2018/0365206 A1    Dec. 20, 2018

Related U.S. Application Data

(63) Continuation of application No. 13/918,910, filed on Jun. 15, 2013, now Pat. No. 10,019,432.

(51) Int. Cl.
*G06F 17/00* (2019.01)
*G06F 17/24* (2006.01)

(52) U.S. Cl.
CPC .................. *G06F 17/246* (2013.01)

(58) Field of Classification Search
None
See application file for complete search history.

(56) References Cited

U.S. PATENT DOCUMENTS

| | | | |
|---|---|---|---|
| 5,613,131 A * | 3/1997 | Moss | G06F 17/246 715/236 |
| 7,849,395 B2 | 12/2010 | Ellis et al. | |
| 8,312,366 B2 * | 11/2012 | Folting | G06F 17/246 707/809 |
| 9,424,244 B2 | 8/2016 | Brissette et al. | |

(Continued)

FOREIGN PATENT DOCUMENTS

JP    2007087238 A    4/2007

OTHER PUBLICATIONS

Mark Dodge et al. Microsoft Office Excel 2007 Inside Out, Jan. 17, 2007, Microsoft Press, pp. 121, 295, 583-619 (Year: 2007).*

(Continued)

*Primary Examiner* — Howard Cortes

(57) ABSTRACT

Conversion of data ranges to table objects in an electronic spreadsheet document is provided. When an electronic spreadsheet document is being utilized, data ranges may be automatically converted to tables to allow the user to enjoy the full benefits of the table properties and functionalities. When a data range is automatically converted to a table object, a user will be given an opportunity to revert the table object back to the data range from which it was converted. Instead of automatic conversion, a suggestion may be provided to a user before a data range is converted to a table object. If the user accepts the suggestion, then the data range may be automatically converted to a table object.

20 Claims, 14 Drawing Sheets

(56) References Cited

U.S. PATENT DOCUMENTS

| | | | | |
|---|---|---|---|---|
| 2006/0136829 A1* | 6/2006 | Abbar | ................... | G06F 9/451 |
| | | | | 715/744 |
| 2006/0156221 A1* | 7/2006 | Chen | ................... | G06F 17/2247 |
| | | | | 715/209 |
| 2009/0234808 A1* | 9/2009 | Zarzar | ................. | G06F 17/3064 |
| 2010/0050101 A1* | 2/2010 | Baik | ................. | G06F 17/30569 |
| | | | | 715/764 |
| 2012/0110579 A1* | 5/2012 | Bullen | ................... | G06Q 10/10 |
| | | | | 718/100 |

OTHER PUBLICATIONS

JKP, Working with Tables in Excel 2007, Mar. 17, 2011, pp. 1-12 Retrieved: https://web.archive.org/web/20110317054851/http://www.jkp-ads.co m/articles/Excel2007tables.asp (Year: 2011).*

Lu, Jane, "Filter Your Data in Spreadsheets", Retrieved from https://drive.googleblog.com/2011/03/filter-your-data-in-spreadsheets.html, Mar. 23, 2011, 4 Pages.

* cited by examiner

FIG. 2

| | A | B | C | D | E | F | G | H | I |
|---|---|---|---|---|---|---|---|---|---|
| 1 | | | | | | | | | |
| 2 | | BIO TEAM ANNUAL BUDGET | | | | | | | |
| 3 | | ANNUAL INCOME | | | | | | | |
| 4 | | ITEM | AMOUNT | | | | | | |
| 5 | | STUDENT LIFE SPONSORSHIP | $1,200.00 | | | | | | |
| 6 | | FUNDRAISING | $900.00 | | | | | | |
| 7 | | | | | | | | | |
| 8 | | ANNUAL EXPENSES | | | | | | | |
| 9 | | ITEM | AMOUNT | | | | | | |
| 10 | | ROOM RENTALS | $250.00 | | | | | | |
| 11 | | TEE SHIRTS | $120.00 | | | | | | |
| 12 | | RED SQUARE TABLE SUPPLIES | $150.00 | | | | | | |
| 13 | | CELL PHONE | $45.00 | | | | | | |
| 14 | | RECYCLING FLIERS | $200.00 | | | | | | |
| 15 | | BOOKS | $300.00 | | | | | | |
| 16 | | MISCELLANEOUS | $300.00 | | | | | | |
| 17 | | MONTHLY MOVIE NIGHT | $75.00 | | | | | | |
| 18 | | | | | | | | | |

FIG. 3

| | A | B | C | D | E | F | G | H | I |
|---|---|---|---|---|---|---|---|---|---|
| | | HOME ∨ | ◢ | ◮ | SEGOE UI ∨ | ⊞ | GENERAL ∨ | ⋯ | ↺ |
| 1 | | | | | | | | | |
| 2 | ⊙ | BIO TEAM ANNUAL BUDGET | | | | | | | |
| 3 | | ANNUAL INCOME | | | | | | | |
| 4 | | ITEM | AMOUNT | | | | | | |
| 5 | | STUDENT LIFE SPONSORSHIP | $1,200.00 | | ✂ 🗐 📋 A ⟐ ⌁ ⌄ | | | | |
| 6 | | FUNDRAISING | $900.00 | | | | | | |
| 7 | | | | | | | | | |
| 8 | | ANNUAL EXPENSES | | | | | | | |
| 9 | | ITEM | AMOUNT | | | | | | |
| 10 | | ROOM RENTALS | $250.00 | | | | | | |
| 11 | | TEE SHIRTS | $120.00 | | | | | | |
| 12 | | RED SQUARE TABLE SUPPLIES | $150.00 | | | | | | |
| 13 | | CELL PHONE | $45.00 | | | | | | |
| 14 | | RECYCLING FLIERS | $200.00 | | | | | | |
| 15 | | BOOKS | $300.00 | | | | | | |
| 16 | | MISCELLANEOUS | $300.00 | | | | | | |
| 17 | | MONTHLY MOVIE NIGHT | $75.00 | | | | | | |
| 18 | | | | | | | | | |

FIG. 4

| | A | B | C | D | E | F | G | H | I |
|---|---|---|---|---|---|---|---|---|---|
| 1 | | | | | | | | | |
| 2 | | BIO TEAM ANNUAL BUDGET | | | | | | | |
| 3 | | ANNUAL INCOME | | | | | | | |
| 4 | | ITEM | AMOUNT | | | | | | |
| 5 | | STUDENT LIFE SPONSORSHIP | $1,200.00 | | | | | | |
| 6 | | FUNDRAISING | $900.00 | | | | | | |
| 7 | | | | | | | | | |
| 8 | | ANNUAL EXPENSES | | | | | | | |
| 9 | | ITEM ↑↓ | AMOUNT ↑↓ | | | | | | |
| 10 | | ROOM RENTALS | SELECT ALL | | | | | | |
| 11 | | TEE SHIRTS | $45.00 | | | | | | |
| 12 | | RED SQUARE TABLE SUPPLIES | $75.00 | | | | | | |
| 13 | | RECYCLING FLIERS | $120.00 | | | | | | |
| 14 | | BOOKS | $150.00 | | | | | | |
| 15 | | MISCELLANEOUS | ABC 123 | | | | | | |
| 16 | | MONTHLY MOVIE NIGHT | | | | | | | |
| 17 | | | | | | | | | |
| 18 | | | | | | | | | |

FIG. 5

|   | A | B | C | D | E | F | G | H | I |
|---|---|---|---|---|---|---|---|---|---|
| 1 | | SEGOE UI | | GENERAL | | | | | |
| 2 | | | | | | | | | |
| 3 | | BIO TEAM ANNUAL BUDGET | | | | | | | |
| 4 | | ANNUAL INCOME | | | | | | | |
| 5 | | ITEM | AMOUNT | | | | | | |
| 6 | | STUDENT LIFE SPONSORSHIP | $1,200.00 | | | | | | |
| 7 | | FUNDRAISING | $900.00 | | | | | | |
| 8 | X | ANNUAL EXPENSES | | | | | | | |
| 9 | | ITEM | AMOUNT | | | | | | |
| 10 | | ROOM RENTALS | $800.00 | | | | | | |
| 11 | | TEE SHIRTS | $120.00 | | | | | | |
| 12 | | RED SQUARE TABLE SUPPLIES | $150.00 | | | | | | |
| 13 | | CELL PHONE | $45.00 | | | | | | |
| 14 | | RECYCLING FLIERS | $200.00 | | | | | | |
| 15 | | BOOKS | $300.00 | | | | | | |
| 16 | | MISCELLANEOUS | $300.00 | | | | | | |
| 17 | | MONTHLY MOVIE NIGHT | $75.00 | | | | | | |
| 18 | | | | | | | | | |

FIG. 9

CONVERSION OF DATA RANGES TO TABLE OBJECTS

CROSS-REFERENCE TO RELATED APPLICATIONS

This application is a Continuation patent application of, and claims the benefit of U.S. Non-Provisional patent application Ser. No. 13/918,910, filed Jun. 15, 2013, now U.S. Pat. No. 10,019,432, the disclosure of which is hereby incorporated herein by reference in its entirety.

BACKGROUND

Computers and computer software applications provide users tremendous assistance with data entry and manipulation, document preparation, music and photography generation and enjoyment, and the like. Unfortunately, many users often are not able to fully utilize their software application products because either they don't know that a helpful function is available, they don't understand the nature of a helpful function, or they know of a function, but they don't know how to use it.

In the case of computer-implemented spreadsheet applications, many users don't use spreadsheet tables because they don't actually understand what spreadsheet tables are, and even if they do understand the nature of spreadsheet tables, they often don't know how to create and/or use them. Thus, an improvement and technical advantage would be gained by providing efficient conversion of data ranges to table objects automatically or after suggestion/acceptance by users.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing conversion of data ranges to table objects in an electronic spreadsheet document. According to embodiments, when an electronic spreadsheet document is being utilized, data ranges may be automatically converted to tables to allow the user to enjoy the full benefits of the table properties and functionalities. When a data range is automatically converted to a table, a user will be given an opportunity to revert the table object back to the data range from which it was converted. According to embodiments, automatic conversion of a data range to a table object may occur under a number of circumstances. For example, upon a sort or filter action on a given data range, the data range may be converted into a table object. Upon entry of data into a data range organized according to a tabular layout, the data range may be converted to a table object. Upon receiving a selection of a cell or other data range in a tabular range of data, the range of data may be converted to a table object. In many of such cases, a suggestion may be provided to a user before the data range is converted to a table object. If the user accepts the suggestion, then the data range may be automatically converted to a table object.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various embodiments of the present invention.

FIG. 2 illustrates a computer-implemented spreadsheet document showing application of a sorting function on a range of data.

FIG. 3 illustrates an automatic conversion of the sorted range of data illustrated in FIG. 2 into a spreadsheet table.

FIG. 4 illustrates a computer-implemented spreadsheet document showing application of a filtering function on a range of data.

FIG. 5 illustrates conversion of the filtered range of data illustrated in FIG. 4 into a spreadsheet table object, and illustrates insertion of a slicer-style filtering user interface.

FIG. 9 illustrates the computer implemented spreadsheet of FIG. 8 showing an automatic conversion of the range of tabular data into a spreadsheet table.

DETAILED DESCRIPTION

Figure 1:
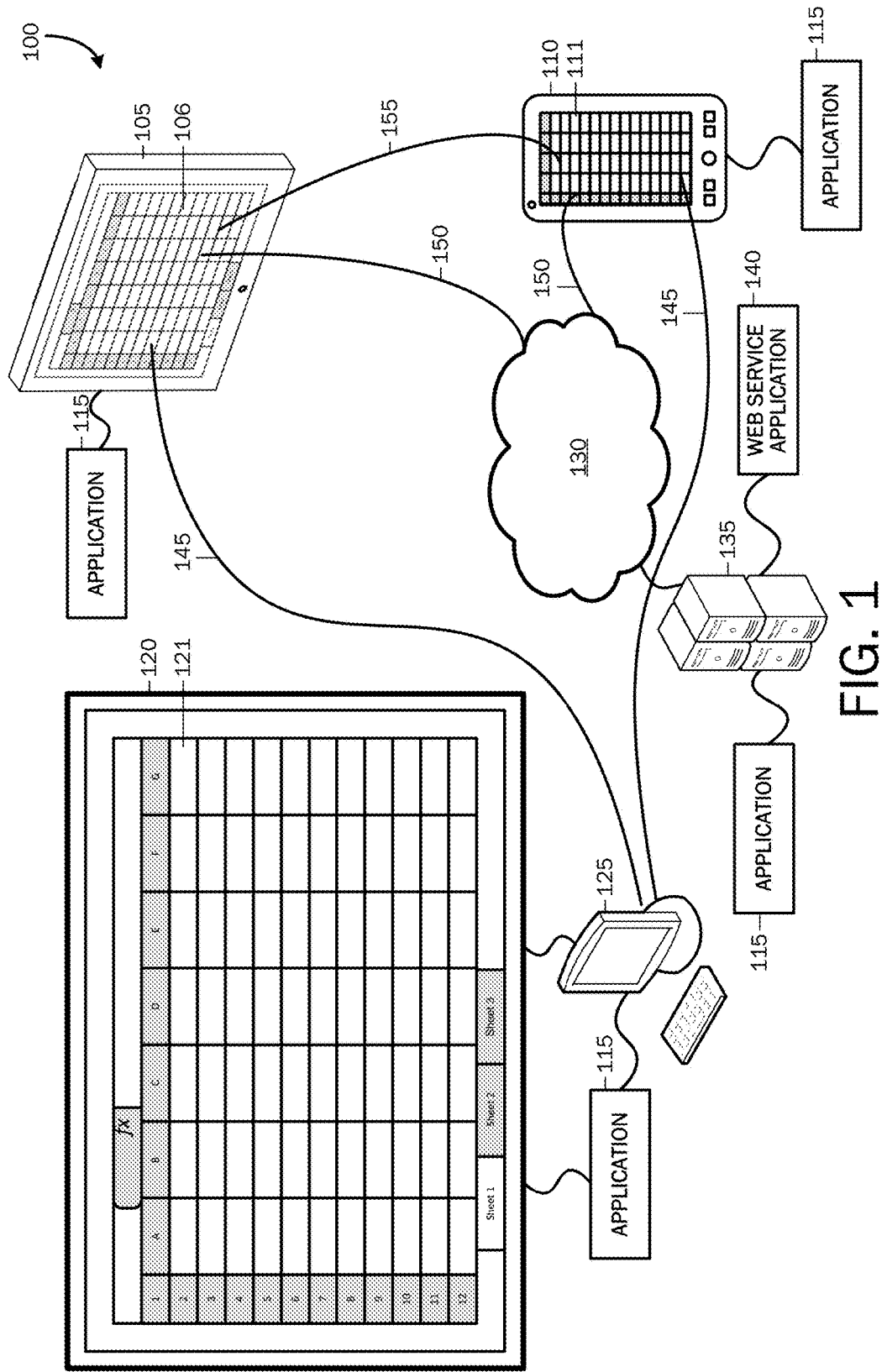
FIG. 1 illustrates a system architecture in which embodiments of the present invention may be practiced.

As briefly described above, embodiments of the present invention are directed to providing efficient conversion of data ranges to table objects automatically or after suggestion and acceptance by a user. The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described may be modified by substituting, reordering, or adding stages to the disclosed methods. Accordingly, the following detailed description does not limit the invention but, instead, the proper scope of the invention is defined by the appended claims.

FIG. 1 illustrates a system architecture in which embodiments of the present invention may be practiced. In FIG. 1, a variety of computing devices are illustrated with which embodiments of the present invention may be practiced on individual computing devices or in a collaborative work session. For example, a small-form smartphone or other handheld computing device 110 is illustrated having a display surface 111 and being associated with an application 115. A larger form tablet-style computing device 105 having a display surface 106 and an associated spreadsheet application 115 is illustrated. A large display device 120 having a display surface 121 is illustrated being associated with a computer 125 and a spreadsheet application 115.

As should be appreciated, the computing devices 105, 110, 120, 125 are purposes of illustration only and are not exhaustive of the various types of computing devices that may be used in accordance with embodiments of the present invention. For example, while the display device 120 is illustrated as a display unit with an associated computing device 125, the large-form display device 120 may operate as an integrated display/computing device that may be used for any suitable use from large-scale display uses, for example, in a conference room, to personal computing, as desired. According to embodiments, each of the computing devices illustrated in FIG. 1 may receive input through a variety of suitable means including touch or gesture input, keyboard input, mouse input, voice command input, electronic inking input, and the like.

Referring still to FIG. 1, the software applications 115 illustrated in association with each of the computing devices 105, 110, 120, 125 are illustrative of any application having sufficient computer executable instructions for enabling embodiments of the present invention as described herein. For example, applications 115 may include spreadsheet applications, word processing applications, slide presentation applications, electronic mail applications, notes taking applications, desktop publishing applications, and the like. An example spreadsheet application 115 includes EXCEL manufactured by Microsoft Corporation of Redmond, Wash. As should be appreciated, this example spreadsheet application is but one example of the many applications suitable for enabling embodiments described herein may be used.

Each of the computing devices 105, 110, 120, 125 may operate in a collaborative work environment through one or more wired or wireless data connections 145, 150, 155. That is, each of the computing devices may communicate with each other through wired or wireless data lines via direct connection, or via connection through a distributed computing network 130 such as an Internet or intranet.

According to embodiments, application functionality associated with each of the computing devices 105, 110, 120, 125 may operate according to one or more variations. For example, each application 115 may be a fully functional "thick" client application having all application functionality including the ability to send and receive data to and from other applications 115 operating on other computing devices in the collaborative work session. Each such application not only has its native functionality, for example, spreadsheet functionality, but according to embodiments of the present invention, each such application also contains sufficient computer executable instructions for allowing each application to operate as a control application for controlling information sent from a control device for receipt by an endpoint display device in a collaborative work environment. Likewise, each such application has sufficient computer executable instructions for allowing the application to operate as an endpoint display device for receiving control functions from another computing device.

According to another embodiment, the computing devices 105, 110, 120, 125 may communicate via a distributed computing network 130, for example, the Internet. Referring still to FIG. 1, the computing device 135 is illustrative of an Internet-based or "cloud-based" server computer on which may be operated one or more web services applications 140 for providing a collaborative work session, as described herein. According to this embodiment, each of the devices 105, 110, 120, 125 may operate as thin client systems, and collaborative communication between the devices may be operated at the direction of the web services application 140 operated at a remote site. According to this embodiment, an application 115 may operate at the remote server 135 wherein each of the devices 105, 110, 120, 125 may access and receive the functionality described herein via a remote service from the server based application 115, for example, via the web services application 140.

As briefly described above, according to embodiments of the present invention, when an electronic spreadsheet document is being utilized, data ranges in the document may be automatically converted to tables to allow the user to enjoy the full benefits of the table properties and functionalities. Conversion of a data range in a spreadsheet document to a table object may occur under a number of circumstances and may occur automatically or after a user acceptance of a suggestion by the application 115 to convert a data range to a table object.

As illustrated in FIG. 2, an example electronic spreadsheet application document 205 is displayed in an electronic spreadsheet application user interface 207. As well known to those skilled in the art, the spreadsheet application document may comprise a grid made up of the intersection of one or more rows with one or more columns comprising individual resulting cells in which various text and data items may be entered for organizing, editing, manipulating, computing, or otherwise utilizing data of various types. Above the displayed document 205 is displayed a row of application functionality buttons and controls with which various functionalities of the example spreadsheet application 115 may be utilized for entering, editing, formatting, or otherwise manipulating data items contained in the spreadsheet document 205.

Referring still to the spreadsheet document 205, a couple of defined data ranges 208, 209 have been entered and structured by a user. For example the data range 208 includes annual income information set out in two columns of the spreadsheet document 205 including a number of textual entries in column B and a number of numeric entries in column C. A second data range 209 includes information associated with an annual expenses report and includes textual data items in column B and corresponding numeric data items in column C. As well known to those skilled in the art, a data range may include a group of adjacent cells that contain values. The adjacent cells may be horizontally adjacent, vertically adjacent, or a combination thereof, and the values may include text values, numeric values, or combinations of both. The two example data ranges 208, 209, illustrated in FIG. 2, have been structured in tabular format, wherein the textual item identifiers are set out in vertically adjacent rows in column B and wherein dollar amounts corresponding to each textual identifier are set out in column C. The second data range 209 is similarly structured according to a tabular format or layout.

As described herein, according to embodiments of the present invention, a data range in a spreadsheet application, for example, the example data ranges 208, 209 may be converted to a spreadsheet table object either automatically, or after a conversion suggestion accepted by a user. According to embodiments, a spreadsheet table is a specific type of spreadsheet object, which when created, provides a relationship between the data items contained in the data range comprising the table object and for which various functionalities may be applied to data items contained in the data range comprising the table object.

As is understood by those skilled in the art, such a table object is different from data that is merely arranged in a tabular format or layout. For example, referring to the data range 209, illustrated in FIG. 2, while the data in the data range 209 are arranged in a tabular layout, as described above, the data range 209 is not a spreadsheet application table object. That is, functionalities such as sorting, filtering, searching, formatting, computational application, and the like applied to items in the data range 209 may not be applied to items in the data range 209 apart from items contained in other data ranges, for example, the data range 208 without specifying particular cells in the data range 209 for application of such functionalities. That is, while the example data range 209 may be structured according to a tabular layout, the items contained in the columns and rows comprising the data range 209 are not bound together as a single object against which various functionalities of the spreadsheet application 215 may be operated.

For example, if a sorting function is applied to column C of the example spreadsheet document 205, the sorting function would automatically apply to all items contained in column C whether they are a part of the first data range 208 or the second data range 209. That is, the sorting range would operate against all data items contained in the column regardless of the particular data range to which they belong. On the other hand, if the data range 208 is converted into a spreadsheet application table object, then application functionalities, for example, sorting, filtering, formatting, computational application, and the like may be applied to rows and columns of data contained in the table object apart from application of those functionalities against other data contained in the spreadsheet document. For example, if the data range 208 is converted to a spreadsheet application table object, then a sorting function could be applied to the dollar figures illustrated in column C of the data range 208, and only the dollar figures contained in the table object comprised of cells B2 through B6 and C2 through C6 would be sorted in response to the example sorting action. Thus, among the enumerable benefits associated with a spreadsheet application table object, the ability to apply spreadsheet application functionality to those data items contained in the cells comprising the designated and generated spreadsheet application table object is particularly useful.

As briefly described above, embodiments of the present invention are directed to automatically converting a data range contained in a spreadsheet application document into a spreadsheet application table object having all the properties, attributes and benefits associated with a spreadsheet application table object, as described above. Referring still to FIG. 2, according to one embodiment, if a user applies or invokes certain functionalities on a data range that are typical of functionalities that may be applied to a spreadsheet object, the specified data range may be automatically converted to a table object. As illustrated in FIG. 2, a contextual user interface menu 215 has been launched to allow a user to invoke a sorting function 220 on the data range 209. According to embodiments, if the data range 209 is not a table object, then upon application of the sort function to the designated data range 209, the data range 209 will be automatically converted to a table object comprised of the cells contained in the rows and columns making up the designated data range 209.

Figure 3:
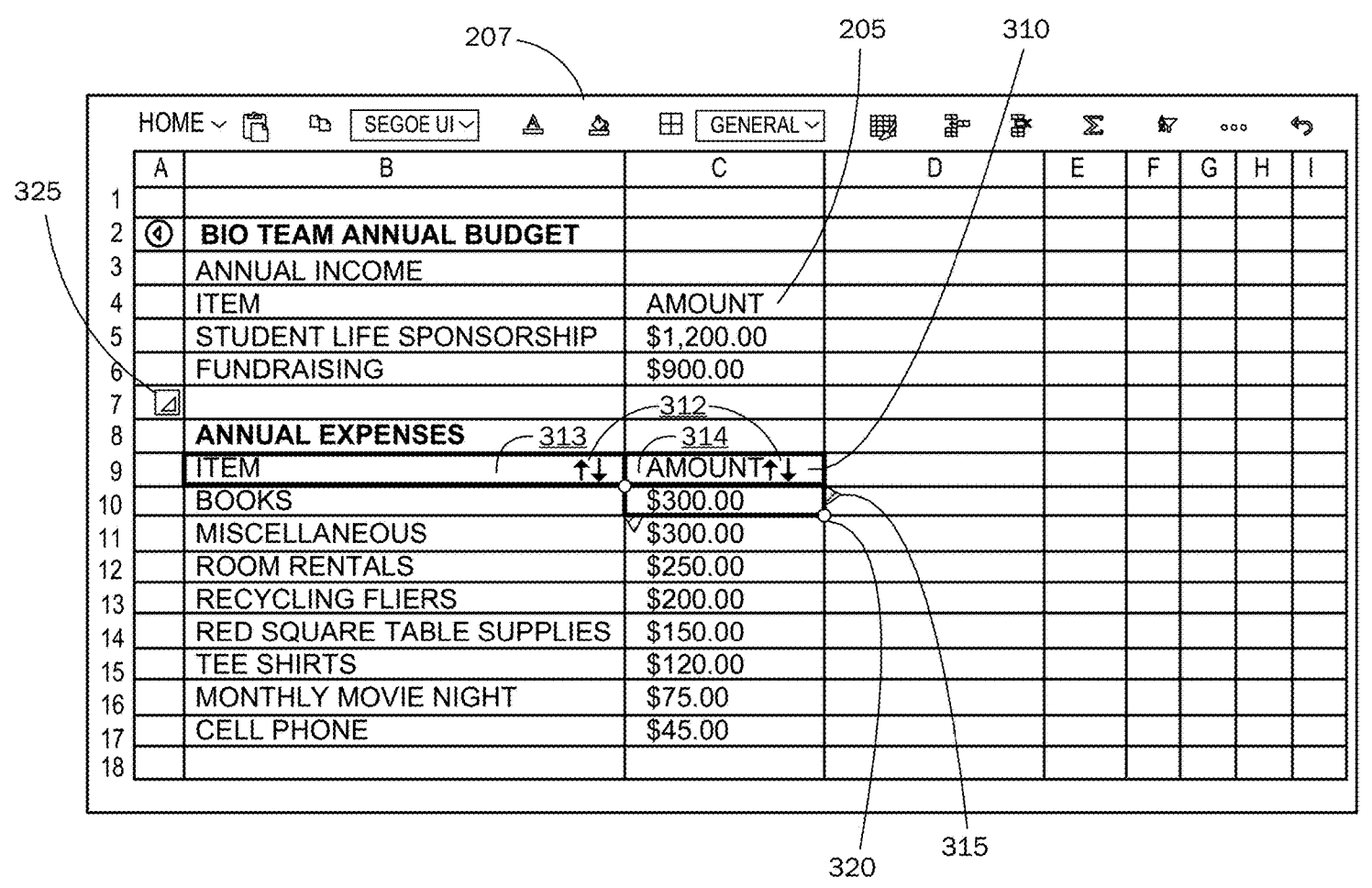

Referring to FIG. 3, the data range that once comprised the data range 209 has been converted to a table object 310, and owing to the application of a sort function on the data range that prompted the conversion of the data range to a table object, the data contained in column C of the newly generated table object 310 has been sorted, and sort function selectable controls 312 have been instantiated in a header cells 313, 314 of the table object 310. As will be described below, prior to automatically converting the data range 209 to a table object 310, a selectable suggestion icon or other function may be provided to the user to allow the user to affirmatively decide whether or not the data range 209 should be converted to a table object 310. Referring still to FIG. 3, a revert control or interface 325 is illustrated in proximity to the converted table object 310 for allowing a user to selectively revert the table object 310 back into the data range 209 if the user does not desire the data range 209 to be converted to a table object 310, as described herein.

Referring now to FIG. 4, the contextual user interface 215 is again illustrated adjacent to a data range 209, as described above. Upon selection of a different function, for example, a filtering function 410, if the selected data range 209 is not a table object, then the data range 209 may be automatically converted to a table object 310, as illustrated in FIG. 5. According to embodiments, when the data range 209 is converted to a table object 310 in response to the invocation of a filtering function, then after conversion of the data range 209 to a table object 310, the invoked filtering function may be applied to the data contained in the newly generated table object 310.

A filter user interface component 410 may be displayed overlaying the table object 310 for allowing application of various filter functions in association with data contained in the table object 310. For example, referring to FIG. 5, a slicer-style filtering user interface 510 has been displayed in the newly generated table object 310, and a number of filtering tiles 515, 520 are illustrated in the user interface 510 for allowing a filtering of data contained in the table object 310 according to an alphabetic filtering property 530 or a numeric filtering property 525. As should be appreciated, the slicer-style filtering user interface 510 is for purposes of example and illustration only and is not limiting of different types of filtering functionalities and user interface components that may be utilized in association with the table object 310 generated in response to the invocation of a filtering function against the data range 209. As described above with reference to FIG. 3, a revert control 325 is displayed in proximity to the newly generated table object 310 to allow a user to selectively revert the table object 310 back to a data range 209 from which it was converted, if desired.

As described above, users often enter data into a spreadsheet document 205 in tabular form, wherein columns of adjacent corresponding data are entered to create a table-like structure wherein various data items contained in the tabular structured data range have various relationships including computational relationships wherein the value of a given cell may be derived from a computation applied against two or more other cells contained in the data range. According to embodiments of the present invention, a data range may be converted to a table object based on user interaction in generating, editing, manipulating, expanding, or otherwise interacting with data structured in a tabular layout. As described below with reference to FIGS. 6 and 7, a data range may be automatically converted to a table object or conversion of a data range to a table object may be suggested to a user in response to user actions on the spreadsheet 205, including data entry, data editing, data manipulation, and the like.

Figure 6:
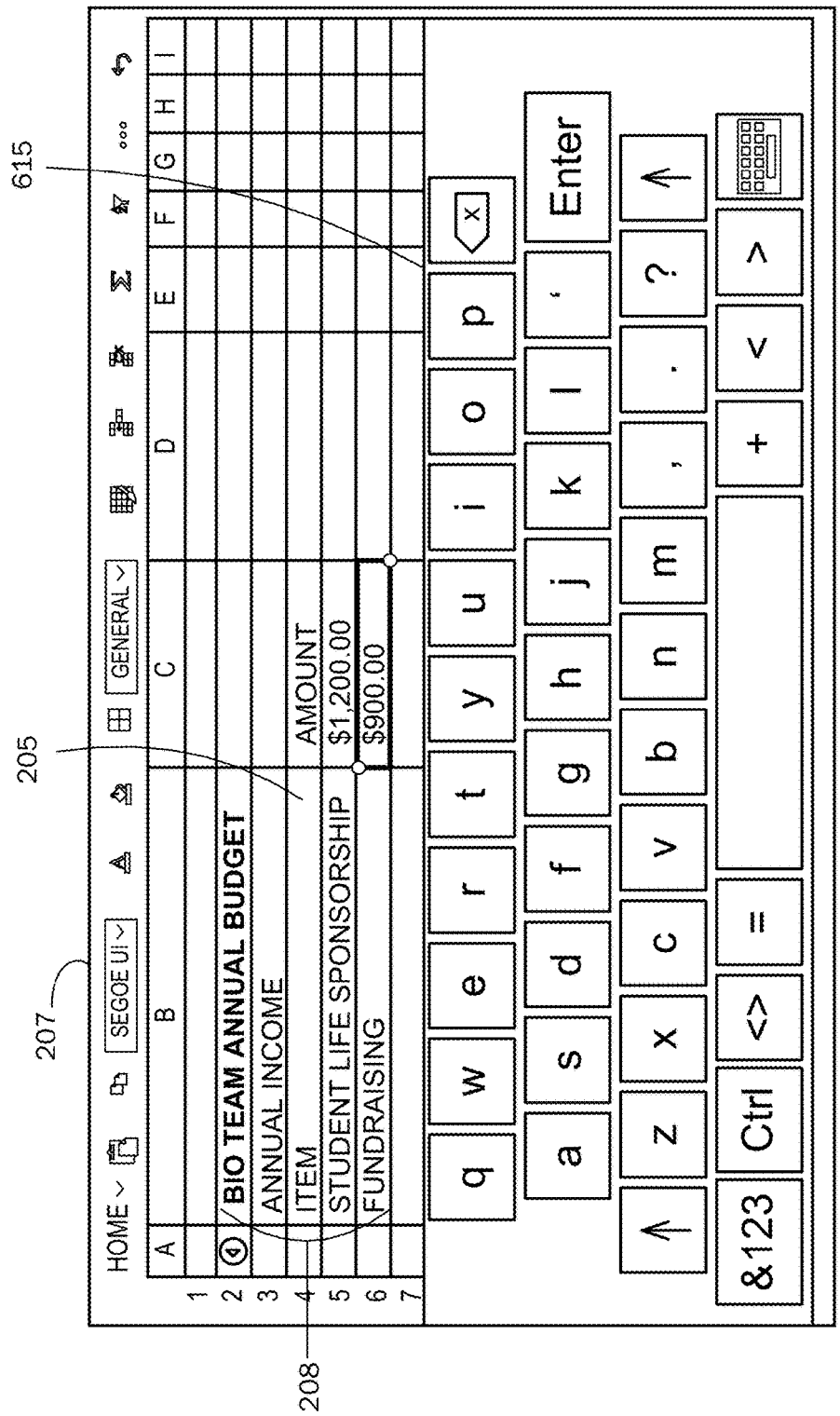
FIG. 6 illustrates a computer-implemented spreadsheet document showing a displayed soft keyboard for entering data into the displayed spreadsheet document.

Referring now to FIG. 6, the spreadsheet application user interface 207 is illustrated with a display of the spreadsheet document 205 and with a deployed "soft" keyboard 615 for allowing entry of one or more data items into the spreadsheet document 205. As should be appreciated, the "soft" keyboard 615 is for purposes of example only and is not limiting of other types of user interaction devices or methods that may be utilized according to embodiments of the present invention. For example, interaction with the user interface 207 and electronic documents displayed therein may be performed according to hardware keyboards, mousing devices, touch or gesture interaction, voice command and combinations thereof.

Figure 7:
FIG. 7 illustrates the spreadsheet document of FIG. 6 and illustrates automatic conversion of a range of data into a spreadsheet table upon entry of data in a tabular data range.

Referring to FIG. 6, according to an embodiment, entry of data or functionality in a spreadsheet application 205 in a manner that may be interpreted as being associated with the properties or functionalities of a spreadsheet table object may cause automatic conversion of a data range to a table object or may cause a suggestion to a user for the conversion of a data range to a table object. For example, the data range 208 has been organized by a user according to a tabular layout, as described above with reference to FIG. 2. According to one embodiment, the mere detection that a data range 208 is organized in the spreadsheet document 205 in a tabular form or layout may be used for automatically converting the data range 208 to a table object, or may be used for suggesting to a user that the data range 208 be converted to a table object, as described below with reference to FIG. 8. According to other embodiments, if a user enters data of any kind into a data range organized in a tabular layout, the entry of data in the data range may be an indication that the user is treating the data range as a table, and accordingly, the data range may be automatically converted to a table object 710, as illustrated in FIG. 7, or a suggestion may be offered to the user to accept conversion of the data range 208 to the table object 710. As described above, a revert button or interface 325 is provided for allowing a user to revert a table object 710 back to the data range 208 from which it was generated.

In addition to simple data entry, other interactions with data contained in a spreadsheet document 205 may be used by the application 115 for determining that a selected data range should be converted to a table object. For example, inserting totals in a row beneath a column of data or of a vertical running total may indicate that the column of data should be treated as a table object along with other columns of data that are associated with the column of data underneath which a total has been inserted. If a user pastes a table or tabular data object into the spreadsheet 205, the pasted table or tabular data object may be inserted as a table object. In various embodiments, if a user downloads tabular data from an external data source, the downloaded tabular data may be inserted as a table object upon completion of the download. In some embodiments, the downloaded tabular data may be converted into table form before being inserted into the spreadsheet. In some embodiments, the spreadsheet application provides a preview of the downloaded tabular data and an option to commit the downloaded tabular data (e.g., an OK control). In other embodiments, the downloaded tabular data is inserted into the spreadsheet and the spreadsheet application provides an option to discard the downloaded tabular data (e.g., an undo or revert control). In addition, pasting an image of tabular data or an image of a table to the document 205 may result in the conversion of the pasted image into a table object. The revert button 325 may be provided to allow a user to undo the conversion if the user in fact did not intend for the pasted content to be converted to a table object upon the pasting operation.

In addition, a formatting action applied to a data range, including applying formatting to a horizontal range of cells, resizing a horizontal range of cells, and/or merging of cells in a horizontal range of cells may be an indication that the user intends for the range of cells to be treated as a single unit, and may indicate to the application 115 that the range of cells should be converted to a table object.

Referring still to FIG. 6, in addition to the foregoing, if a user performs a fill action in a column adjacent to a range of data, the fill action for filling a column of data immediately adjacent to another range of data may be an indication that the user is treating the fill data and the associated range of data as a single tabular unit. Accordingly, the adjacent range of data and the fill data may be combined and may be converted to a table object, as described herein.

Other data entry or manipulation actions that may cause automatic conversion of a data range to a table object include converting a data range to a table object upon receiving an action from a user for formatting a group of cells in a data range with a single data type. For example, if a user selects all cells contained in the data range 208, illustrated in FIG. 6, followed by a formatting action for formatting all text content and numerical content in the data range according to a single formatting type, this action may indicate that the user is treating the group of cells as a single tabular unit, and consequently, the data range may be converted to a table object.

In addition, detection by the application 115 of a range of horizontal cells with key words and/or synonyms for key words (e.g., "notes", "feedback", "comments", and the like) may be an indication that the range of horizontal cells are being treated as a grouping of cells that would benefit from conversion to a table object. Similarly, detection of a range of vertical cells with name values adjacent to a column next to the vertical cells containing numerical values may be an indication that the corresponding cells of data should be converted to a table object, as described herein.

In addition, if a given data range includes formulas or other computational functions that relate cells comprising the data range, the application 115 may cause the data range to be converted to a table object. For example, if a first column contains a first set of numerical values, a second column contains a corresponding set of numerical values, and a third column comprises values computed by mathematically or formulaically relating values from the first column with values in the second column, then the three columns of values may be treated as a related grouping of cells that should be converted to a table object, as described herein. In addition, expanding or copying a formula or other function across an array of cells may likewise be an indication that the array of cells are related to each other and should be converted to a table object for receiving the benefits and functionalities associated with a spreadsheet application table object.

Figure 8:
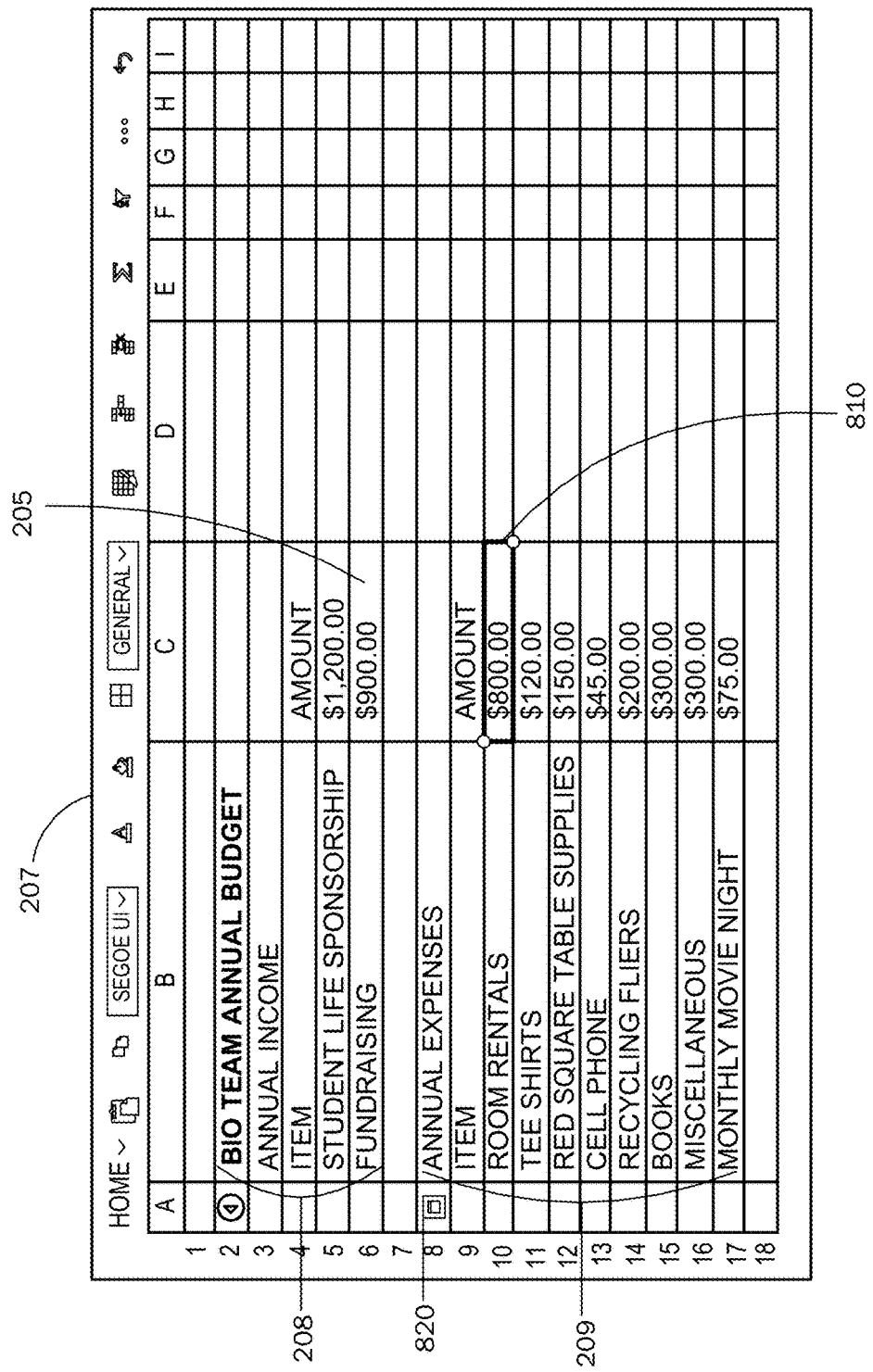
FIG. 8 illustrates a computer-implemented spreadsheet document showing a selection of a cell within a range of tabular data and showing a table conversion suggestion user interface component.
Figure 10:
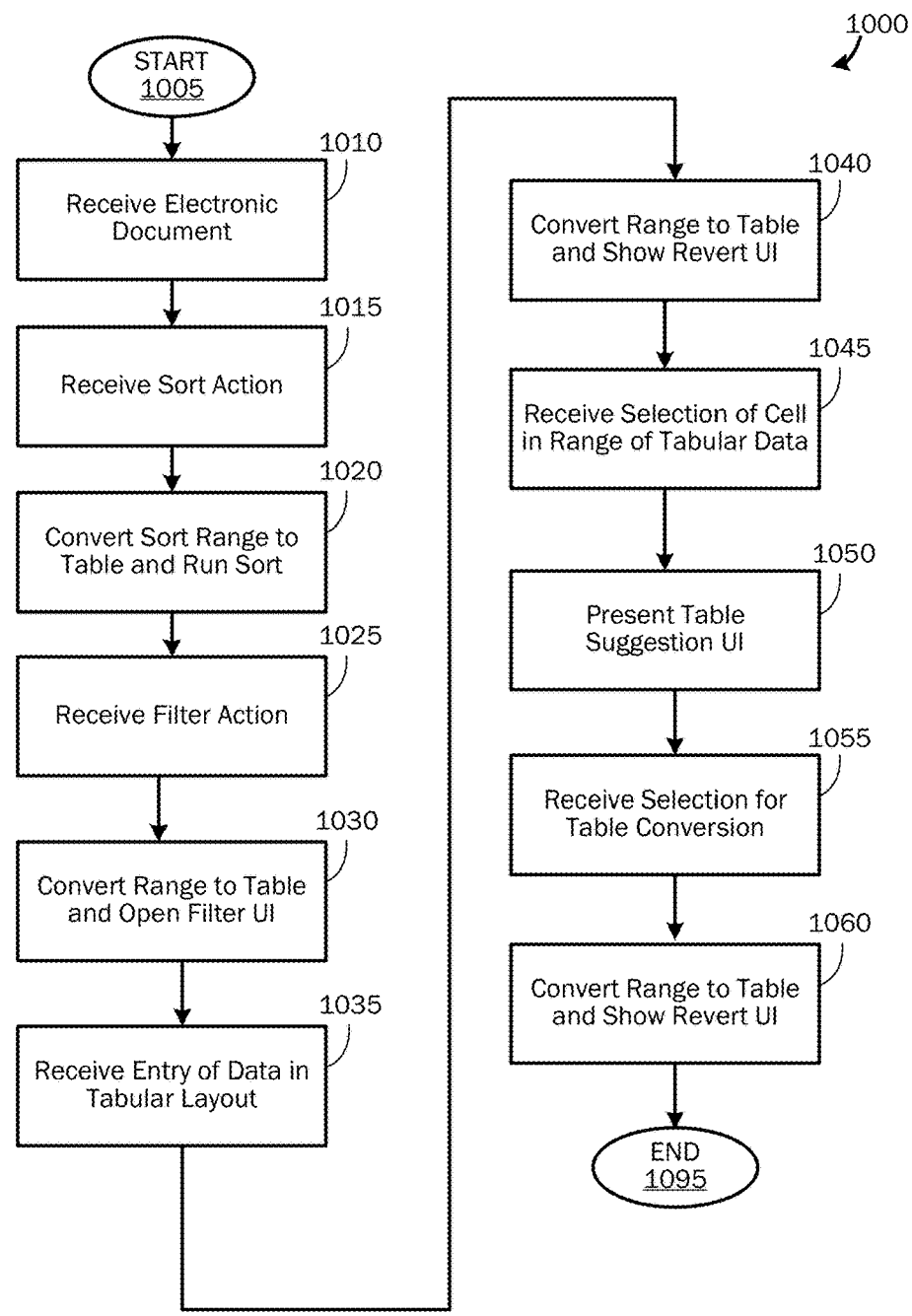
FIG. 10 is a flowchart illustrating a method for providing efficient conversion of data ranges to table objects automatically or after suggestion and acceptance by a user.

As described above, in some cases, a data range may not be automatically converted to a table object, but instead, the application 115 may suggest converting a given data object to a table object. Referring to FIG. 8, if the application 115 determines that a given data range 208, 209 should be converted to a table object, a suggestion user interface component 820 may be displayed adjacent to the data range for suggesting to the user that the associated data range may be converted to a table object. If the user selects the suggestion interface 820 for accepting the suggestion, then the associated data range will be automatically converted to a table object 910, as illustrated in FIG. 9.

According to embodiments, a variety of situations/information may be used by the application 115 for determining that a given data range should be suggested for conversion to a table object. For example, if a user selects a cell within a range of tabular data, for example, the cell 810, illustrated in FIG. 8, the selection of the cell within the tabular data range 209 may cause the application 115 to suggest via display of the interface 820 that the user consider converting the associated data range to a table object. For another example, typing or pasting a horizontal row of textual cells may cause a suggestion that the associated data range be converted to a table object because the horizontal range of textual cells may indicate that other types of data, for example numerical data may be entered beneath each horizontally disposed textual cell as a tabular array of data underneath textual headings. Thus, a suggestion may be made to the user that the data range be converted to a table object.

In addition, typing or pasting such a horizontal row of textual cells where the same row or a similar row has been entered previously in the present document or on a document associated with the present document via a collaborative relationship, as described above with reference to FIG. 1, may provide an indication that the horizontal row of text cells should be converted to a table object. If a full table of data (for example, countries and corresponding populations), or a continuation of a data range, with related values based on the data in the data range, may provide an indication to the application 115 that the table of data or data range continuation should be suggested for conversion to a table object.

According to another embodiment of table object conversion suggestion, data associated with a particular user's spreadsheet interactions, may be obtained from a local or remote service, for example, an Internet-based service, available to the application 115 via a distributed computing network, as described above with reference to FIG. 1. The user's interactions with or responses to the table conversion and/or table suggestion functionality described herein may "teach" the application 115 with respect to automatically converting and/or suggesting conversion of a data range to a table object. For example, information concerning what types of table suggestions or table conversions are accepted by a user may be utilized for assisting the application 115 in subsequent conversions or suggested conversions. Which data types the user typically loads into or enters into data ranges that are either already established as table objects or that are converted to table objects may assist the application 115 in automatically converting or suggesting conversion of a data range to a table object. Other information including the values or types of values entered into table objects or into data ranges converted to table objects, and the values or content associated with column headers and/or titles of table objects and/or data ranges converted to table objects may be utilized for determining when a given data range should be automatically converted to a table object or when a data range should be suggested for conversion to a table object.

Having described an operating environment for and various aspects of embodiments of the present invention with respect to FIGS. 1 through 9, FIG. 10 is a flowchart illustrating a method for providing efficient conversion of data ranges to table objects automatically or after suggestion and acceptance by a user. The routine 1000 begins at start operation 1005 and proceeds to operation 1010 where an electronic spreadsheet document 205 is received in a user interface 207 of a spreadsheet application 115, as illustrated above.

At operation 1015, a user action, for example, a sort action is received on a data range that is interpreted by the application 115 as indicating that the data range is being utilized in a manner typically associated with a table object. At operation 1020, the data range may be automatically converted to a table object, and the sort action may be run on the designated data in the converted table object.

At operation 1025, another user action, for example, a filter action is received on a data range, and at operation 1030, the data range is converted to a table object. After conversion, the filtering action may be operated against the designated data in the converted table object. As should be appreciated, according to embodiments, any operation available to the spreadsheet application 115 that may be performed on a data range that indicates that the data range may be suited for conversion to a table object may be utilized by the application 115 for causing an automatic conversion of the data range to a table object.

At operation 1035, a data entry is received in a data range organized according to a tabular layout. At operation 1040, the data range is automatically converted to a table object, and a revert interface component is provided in proximity to the converted table object to allow the user to convert the table object back to a data range from which it was converted, if desired. As should be appreciated, in any case described herein wherein a data range is converted to a table object, either automatically or after suggestion, a revert user interface component may be provided for allowing the user to convert the table object back to the data range from which it was converted or back into a data range that is different from the original data range from which it was converted.

At operation 1045, a selection of a cell in a range of tabular data is received, and at operation 1050, a suggestion is made to the user via a table object conversion suggestion interface, as illustrated and described above with reference to FIG. 8. At operation 1055, if desired, a selection of the conversion interface may be received. At operation 1060, if the user accepts the suggested conversion, the associated data range is converted to a table object, and the revert interface is displayed. As should be appreciated, for operations 1045 through 1060, any of a number of situations, as described in detail above, may be utilized by the application 115 for suggesting that a data range be converted to a table object. After all data ranges causing automatic conversion to table objects or all data ranges causing suggestion for conversion to table objects are processed, as described above, the routine 1000 ends at operation 1095.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 11:
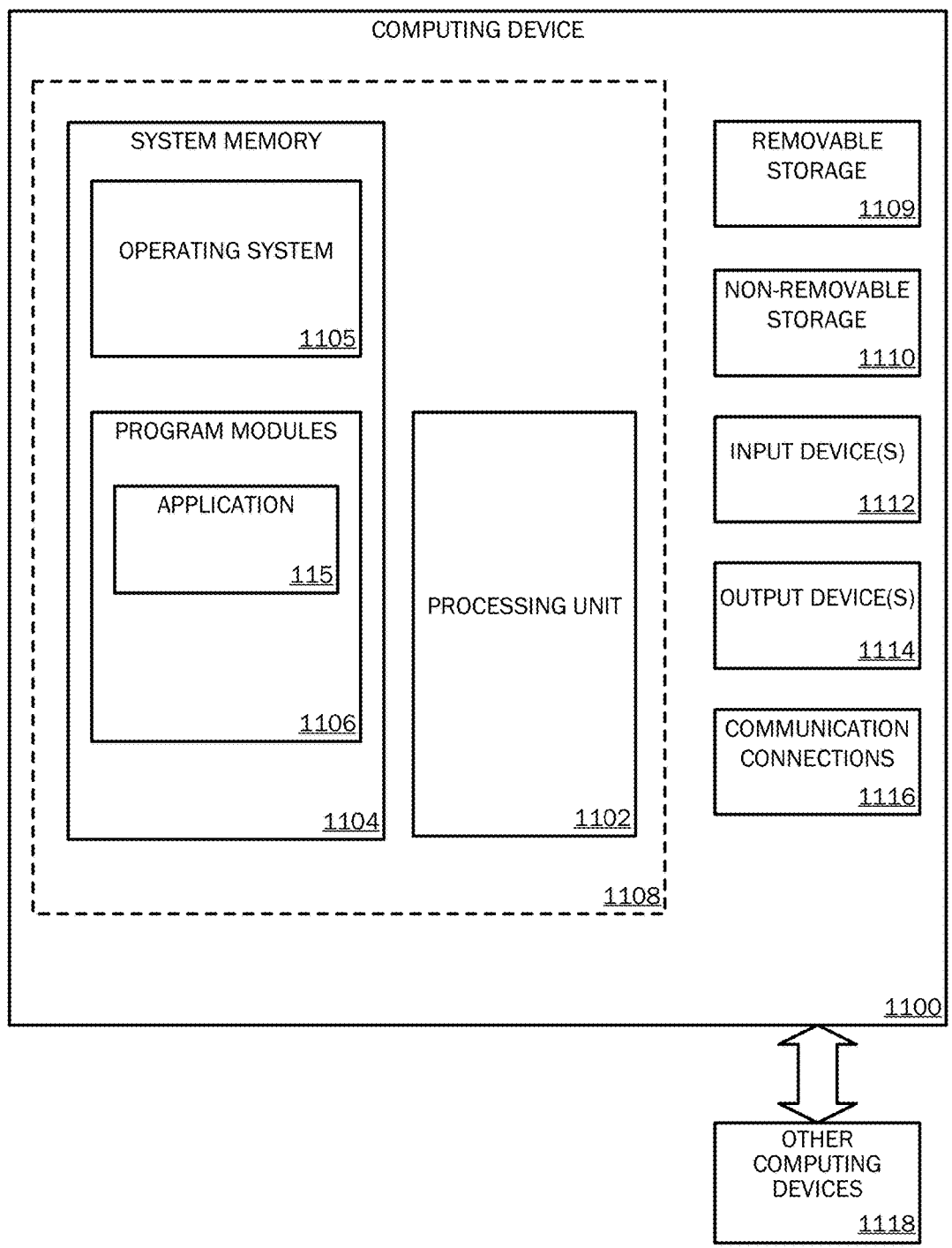
FIG. 11 is a block diagram illustrating example physical components of a computing device with which embodiments of the invention may be practiced.
Figure 12A:
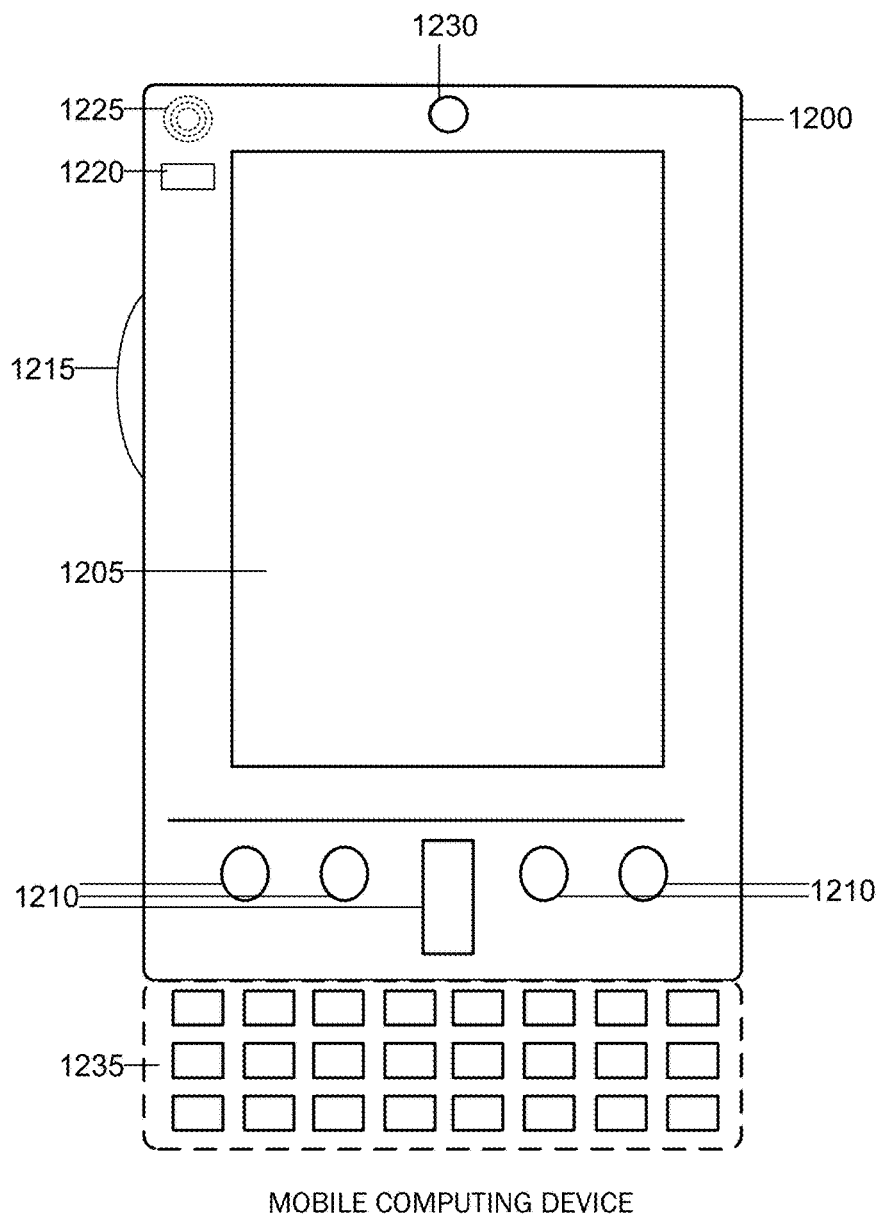
FIGS. 12A and 12B are simplified block diagrams of a mobile computing device with which embodiments of the present invention may be practiced.
Figure 12B:
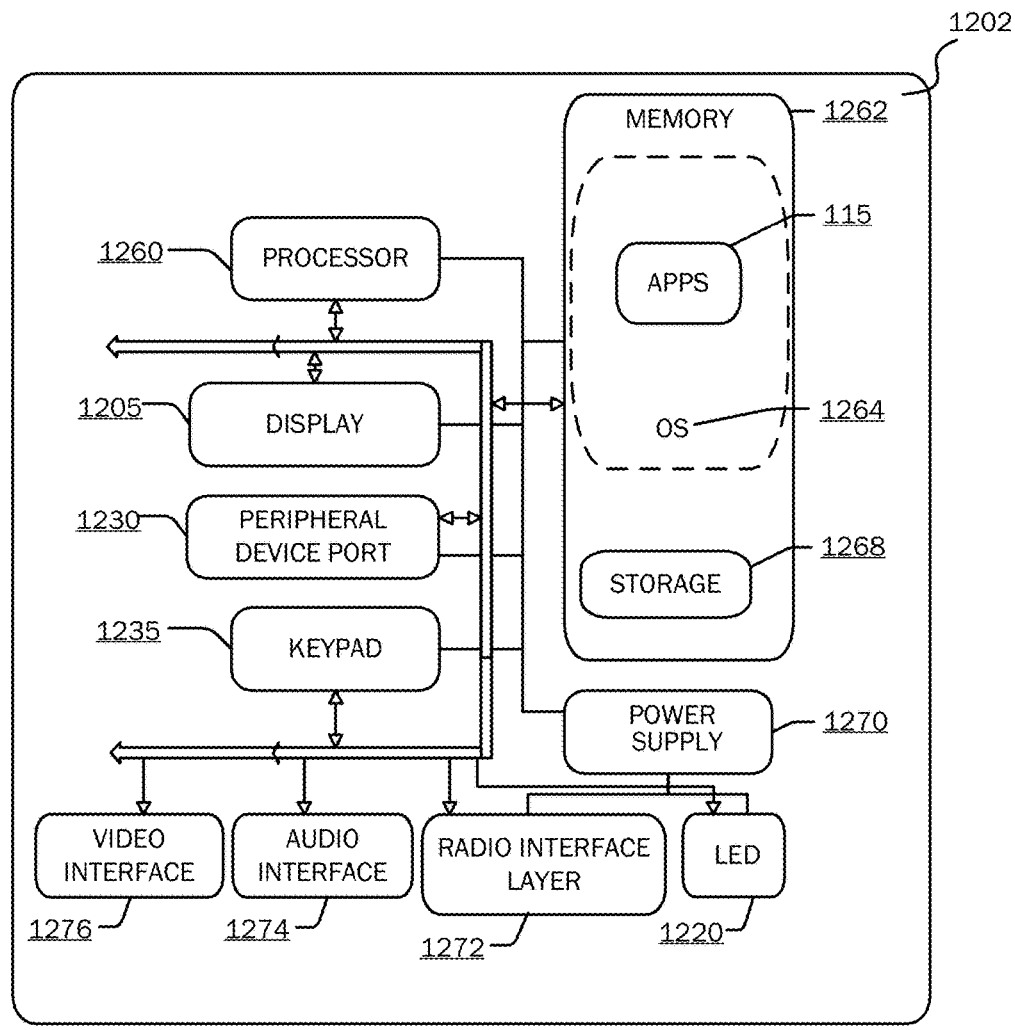
Figure 13:
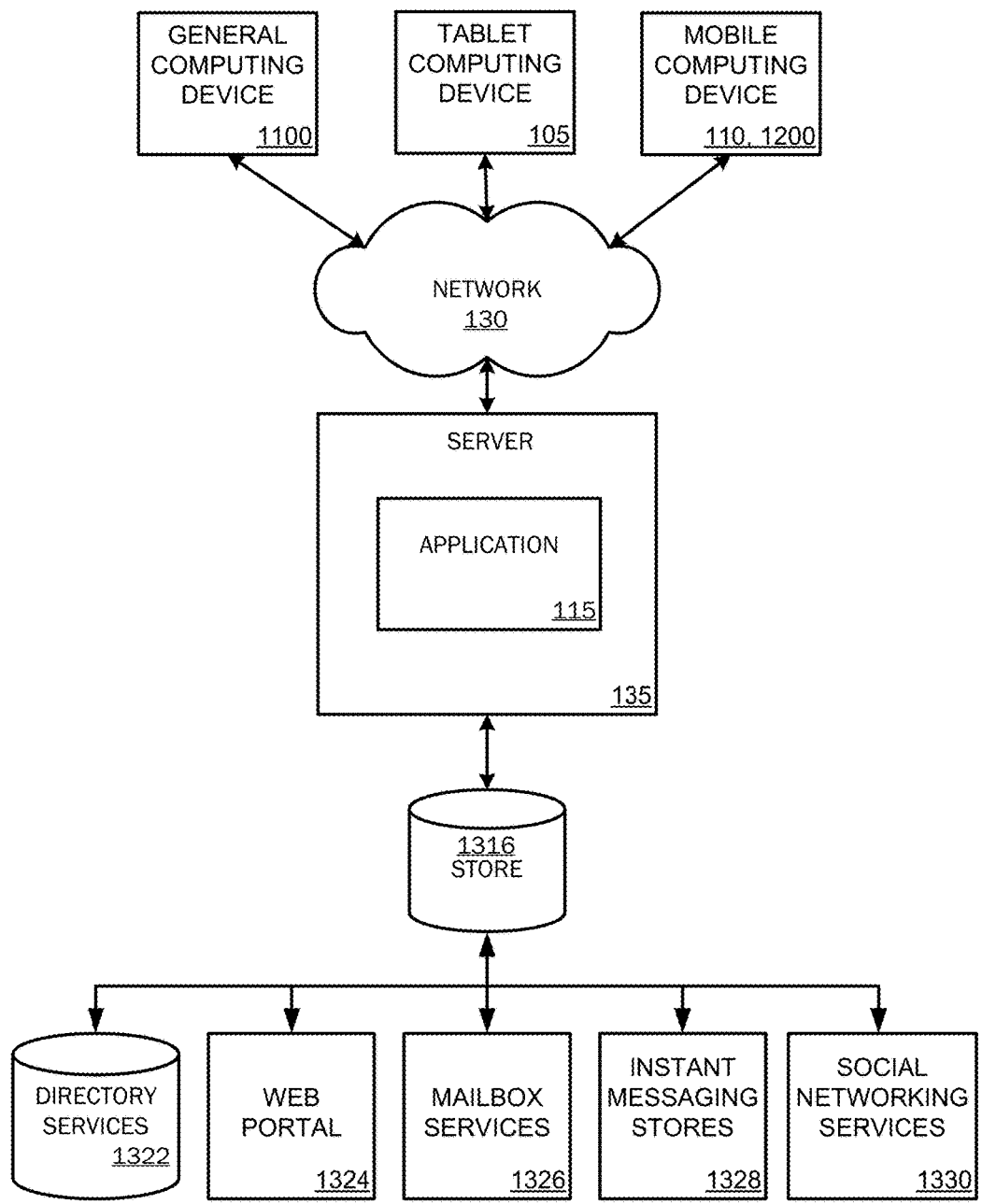
FIG. 13 is a simplified block diagram of a distributed computing system in which embodiments of the present invention may be practiced.

FIGS. 11-13 and the associated descriptions provide a discussion of a variety of operating environments in which embodiments of the invention may be practiced. However, the devices and systems illustrated and discussed with respect to FIGS. 11-13 are for purposes of example and illustration and are not limiting of a vast number of computing device configurations that may be utilized for practicing embodiments of the invention, described herein.

FIG. 11 is a block diagram illustrating physical components (i.e., hardware) of a computing device 1100 with which embodiments of the invention may be practiced. The computing device components described below may be suitable for the computing devices 105 described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running a variety of applications 1120. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 may perform processes including, but not limited to, one or more of the stages of the method 1000 illustrated in FIG. 10. Other program modules that may be used in accordance with embodiments of the present invention may include applications, such as, notes applications, Internet browser applications, electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to use of web page content may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100.

FIGS. 12A and 12B illustrate a mobile computing device 1200, for example, a mobile telephone, a smart phone 110, a tablet-style personal computer 105, a laptop computer, and the like, with which embodiments of the invention may be practiced. With reference to FIG. 12A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one embodiment of a mobile computing device. That is, the mobile computing device 1200 can incorporate a system (i.e., an architecture) 1202 to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs may be loaded into the memory 1262 and run on or in association with the operating system 1264. Examples of the application programs include phone dialer applications, e-mail applications, personal information management (PIM) applications, word processing applications, spreadsheet applications, Internet browser applications, notes applications, messaging applications, and so forth. The system 1202 also includes a non-volatile storage area 1268 within the memory 1262. The non-volatile storage area 1268 may be used to store persistent information that should not be lost if the system 1202 is powered down. The application programs may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 120 via the operating system 1264, and vice versa.

The visual indicator 1220 may be used to provide visual notifications and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 13 illustrates one embodiment of the architecture of a system for providing table object conversion, as described above. Content developed, interacted with, or edited in association with embodiments of the invention may be stored in different communication channels or other storage types. For example, various documents and stored content items may be stored using a directory service 1322, a web portal 1324, a mailbox service 1326, an instant messaging store 1328, or a social networking site 1330. The table object conversion functionality described herein may use any of these types of systems or the like for enabling data utilization, as described herein. A server 135 may provide output of the table object conversion and associated functionality to clients. As one example, the server 135 may be a web server providing the table object conversion and associated functionality over the web. The server 135 may provide the output of the table object conversion and associated functionality over the web to clients through a network 130. By way of example, the client computing device may be implemented and embodied in a personal computer 1100, a tablet computing device 105 and/or a mobile computing device (e.g., a smart phone) 110, or other computing device. Any of these embodiments of the client computing device 1100, 105, 110, 120, 125, 135 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A computer-implemented method of converting a data range in an electronic document into a table object, the method comprising:
   receiving a selection of at least a portion of the data range, wherein the data range is organized in a tabular layout and does not include a table object;
   converting the data range into a table object;
   providing an interface for receiving a selection of a function for:
      filtering data in the table object; or
      sorting data in the table object; and
   in response to receiving a selection of a function for filtering or sorting data in the table object, applying the function to at least a portion of the data in the table object.

2. The method of claim 1, further comprising:
   after converting the data range into the table object, displaying a control element for receiving a selection to revert the table object back into the data range; and
   based on receiving a selection of the control element, reverting the table object back into the data range.

3. The method of claim 1, wherein providing the interface for receiving the selection of the function for filtering data or sorting data in the table object comprises providing one or more control elements for receiving the selection of the function for filtering data or sorting data in the table object.

4. The method of claim 1, wherein providing the interface for receiving the selection of the function for filtering data or sorting data in the table object comprises providing a slicer-style user interface that includes one or more filtering tiles.

5. The method of claim 4, wherein the one or more filtering tiles comprises a numeric filtering tile or an alphabetic filtering tile.

6. The method of claim 5, wherein applying the function to the at least the portion of the data in the table object in response to receiving the selection of the function for filtering data in the table object comprises:
   receiving a selection of the numeric filtering tile; and
   filtering the at least the portion of the data in the table object based on the selection of the numeric filtering tile.

7. The method of claim 5, wherein applying the function to the at least the portion of the data in the table object in response to receiving the selection of the function for filtering data in the table object comprises:
   receiving a selection of the alphabetic filtering tile; and
   filtering the at least the portion of the data in the table object based on the selection of the alphabetic filtering tile.

8. A system for converting a data range into a table object, comprising:
   one or more processors; and
   a memory coupled to the one or more processors and storing instructions, that when executed by the one or more processors, cause the system to:
      receive a selection of at least a portion of a data range, wherein the data range is organized in a tabular layout and does not include a table object;
      provide a first interface for receiving a selection of a sorting function or a filtering function;
      in response to receiving a selection of the sorting function or the filtering function, convert the data range into a table object;
      provide a second interface for receiving a selection to:
         filter data in the table object; or
         sort data in the table object; and
      in response to receiving a selection to filter data or sort data in the table object, apply the selection to at least a portion of the data in the table object.

9. The system of claim 8, wherein the memory stores instructions, that when executed by the one or more processors, further cause the system to:
   display a control element for receiving a selection to revert the table object back into the data range; and
   based on a selection of the control element, revert the table object back into the data range.

10. The system of claim 8, wherein providing the first interface for receiving the selection to filter data or to sort data comprises providing one or more control elements for receiving the selection to filter data or to sort data in the table object.

11. The system of claim 8, wherein the second interface comprises a slicer-style user interface that includes one or more filtering tiles.

12. The system of claim 11, wherein applying the selection to the at least the portion of the data in the table object comprises:
receiving a selection of at least one filtering tile; and
filtering the at least the portion of the data in the table object based on the selection of the at least one filtering tile.

13. The system of claim 12, wherein the at least one filtering tile comprises a numeric filtering tile or an alphabetic filtering tile.

14. The system of claim 8, wherein converting the data range into the table object comprises automatically converting the data range into the table object in response to receiving the selection to filter data in the table object or to sort data in the table object.

15. The system of claim 8, wherein:
in response to receiving the selection to filter data or to sort data in the table object, convert the data range into the table object comprises in response to receiving a selection to filter data in the table object, convert the data range into the table object; and
in response to receiving the selection to filter data or to sort data in the table object, apply the selection to at least a portion of the data in the table object comprises in response to receiving the selection to filter data in the table object, filtering at least a portion of the data in the table object.

16. A method of converting a data range into a spreadsheet table object, comprising:
providing a spreadsheet having a data range organized in a tabular layout and not including a table object;
receiving a selection of at least a portion of the data range;
displaying an interface for receiving a selection of a filter function;
in response to receiving a selection of the filter function, automatically converting the data range into a spreadsheet table object;
providing a filtering interface for receiving a selection of a filtering action; and
in response to receiving a selection of the filtering action, filtering at least a portion of the data in the spreadsheet table object.

17. The method of claim 16, further comprising:
after the data range is converted into the spreadsheet table object, displaying a control element for reverting the spreadsheet table object back into the data range; and
in response to receiving a selection of the control element, reverting the spreadsheet table object back into the data range.

18. The method of claim 16, wherein providing the filtering interface for receiving the selection of the filtering action comprises providing a slicer-style user interface comprising at least one numeric filtering tile or at least one alphabetic filtering tile.

19. The method of claim 18, wherein filtering the at least the portion of the data in the spreadsheet table object in response to receiving the selection of the filtering action comprises:
receiving a selection of a numeric filtering tile; and
filtering the at least the portion of the data in the spreadsheet table object based on the selection of the numeric filtering tile.

20. The method of claim 18, wherein filtering the at least the portion of the data in the spreadsheet table object in response to receiving the selection of the filtering action comprises:
receiving a selection of an alphabetic filtering tile; and
filtering the at least the portion of the data in the spreadsheet table object based on the selection of the alphabetic filtering tile.

* * * * *